Oct. 6, 1964  R. Y. CASE  3,151,491
BELT AND BELT-PULLEY DRIVE
Filed Aug. 4, 1958

INVENTOR.
RICHARD Y. CASE
BY William H. Epes
ATTORNEY 3,151,491
BELT AND BELT-PULLEY DRIVE
Richard Y. Case, Philadelphia, Pa., assignor to United
States Rubber Company, a corporation of New Jersey
Filed Aug. 4, 1958, Ser. No. 752,763
3 Claims. (Cl. 74—229)

This invention relates to an improved combination V and positive drive transmission belt and a drive comprising at least one tooth pulley which is engaged by the positive driving side to said belt and at least one V-grooved pulley which is frictionally engaged by the opposite frictional driving V portion of the belt.

Heretofore, V-belts and positive drive transmission belts were known and successfully used separately, but it was not known how to combine the necessary belt elements in a unitary construction to produce a combination V and positive drive belt having the optimum performance characteristics of both types of belts. For example, the combination V and positive drive belt disclosed in United States Patent No. 1,828,136, issued October 20, 1931, to A. L. Freedlander has a V frictional driving portion of the belt interposed between the tension or strain resisting member and the belt teeth. That belt had a very restricted use, and the teeth were subject to a change of pitch when they engaged and disengaged the pulley teeth, which made the belt incapable of driving two tooth pulleys of different diameters.

In accordance with this invention the strain resisting or tension member is located between the longitudinal truncated V-shaped frictional driving and positive driving portions of the belt and the longitudinal side edges of the frictional driving portion of the belt converge in the direction extending away from the strain resisting member, so that the frictional driving portion of the belt will be supported in compression, regardless of whether such portion is placed on the inside or outside of the run. To make the belt flexible, the V-shaped longitudinal frictional driving portion is provided with transverse notches. In order to securely bond the notched frictional driving portion to the strain resisting member, a layer of resilient material, such as soft solid rubber is interposed between and bonded to the frictional driving portion of the belt and the strain resisting member, and the bottoms of the notches are separated from the strain resisting member by the resilient material. The dedendum line of the belt teeth is located as close as practical to the strain resisting member to prevent any substantial change of pitch of the belt teeth as they engage and disengage the pulley teeth.

When the elements are combined and arranged in the above described manner the frictional and positive driving portions of the belt retain their usual optimum functional characteristics.

This invention, its objects, and advantages are further described in reference to the accompanying drawings, in which.

Figure 1:
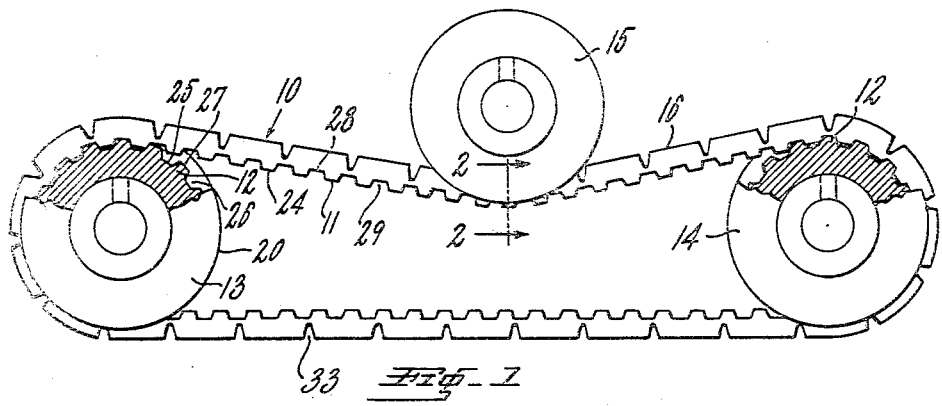
FIG. 1 is an elevational view of a belt and pulley drive embodying this invention with parts shown in section.
Figure 2:
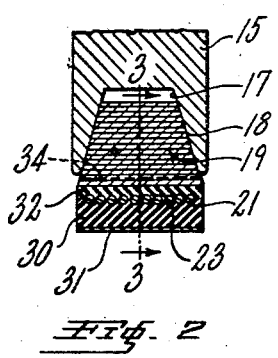
FIG. 2 is an enlarged cross-sectional view of the belt embodying this invention taken on line 2—2 of FIG. 1, and showing a portion of the V-grooved pulley cooperating with the frictional driving portion of the belt.

Referring to FIG. 1 of the drawings, the belt and pulley assembly embodying this invention comprises a belt 10 having teeth 11 on one side thereof, which mesh with teeth 12 on pulleys 13 and 14 on the inside of the belt run. As shown in FIGS. 1 and 2, a V-grooved pulley 15 cooperates with the upper reach 16 of the belt 10 extending between the pulleys 13 and 14. As shown particularly in FIG. 2, the V-groove 17 and the pulley 15 frictionally engages side edges 18 of the truncated V-section 19 of the belt as in a conventional V-belt drive. In this assembly, the belt 10 drives the pulley 15 in the opposite direction to the pulleys 13 and 14, and provides a combination frictional and positive drive, which is of advantage in certain types of drives, where it is desirable to drive a high inertia member from a positive or geared drive.

The belt teeth 11 mesh with the pulley teeth 12, as shown and described in United States Patent No. 2,507,852 issued to this applicant on May 16, 1950. The pulleys 13 and 14 are provided with flanges 20 to retain the belt 10 on the pulleys.

Figure 3:
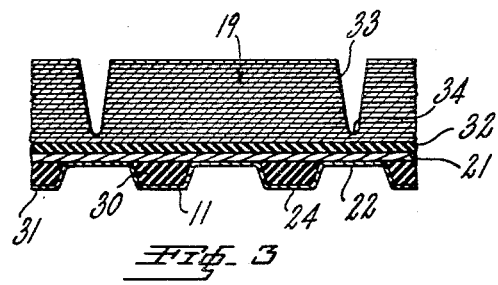
FIG. 3 is a longitudinal cross-section of the belt taken on line 3—3 of FIG. 2.

As shown in FIGS. 2 and 3, the belt is provided with a tension or strain resisting member 21, which is located substantially on the dedendum line 22 of the belt teeth 11, and it comprises a plurality of helical convolutions of a relatively inextensible strand 23, which lie in a single layer across the belt. Such strands may be made of flexible stranded high tensile wire, or fibrous cords. As the strain resisting member 21 lies substantially on the dedendum line 22 of the belt teeth, there is substantially no change in pitch of the belt teeth as they engage and disengage the pulley teeth 12, and when they are fully engaged, the tops 24 of the belt teeth are preferably spaced from the bottoms 25 of the grooves 26 between the pulley teeth 12, and the tops 27 of the pulley teeth engaged the bottoms 28 of the grooves 29 between the belt teeth 11. Such construction enables the belt and pulley teeth to engage without interference, regardless of whether the pulleys 13 and 14 have the same diameter or different diameters.

The belt teeth 11 are made of a resilient material, such as soft solid rubber 30, which is securely bonded to the strain resisting member 21, and such belt teeth may be covered with a protective fabric cover 31. A layer of resilient material 32, such as soft solid rubber, is securely bonded to the side of the strain resisting member opposite to the belt teeth 11. The truncated V-shaped frictional driving portion 19 of the belt is made of a plurality of layers of rubberized, or friction coated fabric, which are securely bonded together, and the bottom layer is securely bonded to the resilient layer 32, which provides a strong, flexible, resilient bond between the frictional driving section 19 and the strain resisting member 21.

The truncated V-shaped frictional driving section 19 is provided with suitably spaced transverse notches 33 to increase the flexibility of the belt when bent to either side of the strain resisting member 21. Preferably, the notches 33 are evenly spaced and the number of notches are about 0.5 to about 1.5 times the number of belt teeth. As shown in the drawings, the V-shaped notches 33 may have a width less than, or substantially less than the spaces between the belt teeth, the width being measured in the direction of the belt length. Preferably, the depth of the notches are about 75 to about 100% of the depth of the frictional driving portion 19, but in any event the bottom 34 of the notches 33 should be separated from the strain resisting member by a substantial thickness of the resilient material 32, not less than .010 inch (which may be the minimum thickness of resilient layer 32), in order to prevent cracks and strains from developing at the bottom of the notches, and thereby cause the sections between the notches 33 of the frictional driving portion 19 to be torn away from the strain resisting member 21. The bottoms 34 of the notches are also rounded to aid in the prevention of cracks and strains occurring in that area.

The sides, or edges 18 of the V-shaped frictional driving section 19 converges towards each other in the direction away from the strain resisting member 21 in order to provide a construction which will enable the belt to operate in a driving assembly when the frictional driving portion 19 is placed either on the inside or outside of the belt run. This belt is so constructed that it may operate as shown in the assembly in FIG. 1, and it may also successfully operate when the frictional driving portion is turned to the inside of the belt run, and V-grooved pulleys are substituted for the tooth pulleys 13 and 14, and a toothed driving pulley is substituted for the V-grooved pulley 15, which would be used to drive the belt. Regardless of whether the belt may be operated with the V-shaped truncated frictional driving section 19 on the inside or outside of the belt run, the strain resisting member 21 will support the truncated V-shaped section of the belt in compression as in the usual V-belt drive, which provides the optimum conditions under which a V-belt should operate to obtain maximum service from the belt.

Figure 4:
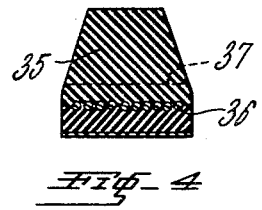
FIG. 4 is a transverse cross-sectional view of a modified form of the belt.

The modification of the belt construction shown in FIG. 4, is similar to the construction shown in FIGS. 2 and 3, excepting the frictional driving section 35 of the belt is made entirely of resilient material, such as soft, solid rubber. In this case, resilient frictional driving portion 35 may be made of the same rubber as that placed adjacent to the strain resisting member 36. The frictional driving portion 35 is provided with transverse notches as shown in FIGS. 2 and 3, and the bottom 37 of such notches are terminated short of the strain resisting member 36, and rounded at their bottoms as shown in FIG. 3.

While the preferred forms of this invention have been shown and described herein more or less in detail, it is to be understood that changes may be made in the construction of the belt embodying this invention without departing from the spirit of the invention, and it is intended to cover all such changes which come within the scope of the appended claims.

Having thus described my invention, what I claim and desire to protect by Letters Patent is:

1. A combination V and positive drive transmission belt comprising resilient teeth on the positive drive side of said belt adapted to mesh without change of pitch with pulley teeth, a single layer of a substantially inextensible strain resisting member located substantially on the dedendum line of said resilient teeth and bonded thereto, a layer of resilient material on the side of said strain resisting member opposite to said resilient teeth and bonded to said strain resisting member, a longitudinal frictional driving portion of truncated V-shaped transverse cross section having longitudinal edges converging away from said resilient material layer, said frictional drive portion being bonded to said resilient material layer and having transverse notches therein, and the bottoms of said notches being separated from said strain resisting member by said layer of resilient material.

2. The belt of claim 1, in which the minimum thickness of said resilient material layer is 0.010 inch.

3. A belt and pulley drive comprising a plurality of pulleys, at least one of which has hard surfaced teeth and at least one of which is a V-belt pulley, driving means for effecting the rotation of one of said pulleys, and an endless belt engaged with said pulleys, said belt having resilient teeth adapted to mesh without change of pitch with said pulley teeth, a single layer, substantially inextensible strain resisting member located substantially on the dedendum line of said resilient teeth and bonded thereto, a layer of resilient material on the side of said strain resisting member opposite to said resilient teeth and bonded to said strain resisting member, a longitudinal friction driving portion of truncated V-shaped transverse cross section having edges converging away from said resilient material layer, said friction driving portion being bonded to said resilient material layer and having transverse notches therein, and the bottoms of said notches being rounded and being separated from said strain resisting member by said resilient material layer.

References Cited in the file of this patent

UNITED STATES PATENTS

| | | |
|---|---|---|
| 2,016,140 | Freedlander | Oct. 1, 1935 |
| 2,507,852 | Case | May 16, 1950 |
| 2,831,359 | Carle | Apr. 22, 1958 |